United States Patent [19]
Schrishuhn, Jr.

[11] 4,194,753
[45] Mar. 25, 1980

[54] SKI-SHOE-ATTACHMENT APPARATUS FOR SKATEBOARDS

[76] Inventor: Delbert Schrishuhn, Jr., 18808 E. Petunia, Azusa, Calif. 91702

[21] Appl. No.: 922,977

[22] Filed: Jul. 10, 1978

[51] Int. Cl.$^2$ .................. B62B 19/02; B62B 13/06; A63C 17/18
[52] U.S. Cl. .................. 280/13; 280/7.12; 280/7.13; 280/16
[58] Field of Search .......... 280/13, 7.12, 7.13, 280/7.14, 87.04 A, 87.04 R, 8, 16, 17, 28

[56] References Cited
U.S. PATENT DOCUMENTS

| | | | |
|---|---|---|---|
| 791,343 | 5/1905 | Holtman | 280/13 |
| 1,394,629 | 10/1921 | Leicht, Jr. | 280/16 |
| 2,352,966 | 7/1944 | Morando | 280/13 X |
| 3,153,543 | 10/1964 | Magyar | 280/7.13 |
| 3,235,282 | 2/1966 | Bostick | 280/87.04 A |
| 3,774,926 | 11/1973 | Chase | 280/13 |
| 4,116,455 | 9/1978 | Dotson et al. | 280/87.04 A X |

*Primary Examiner*—John A. Pekar
*Assistant Examiner*—Milton L. Smith
*Attorney, Agent, or Firm*—Francis X. LoJacono

[57] ABSTRACT

A ski-shoe-attachment apparatus adapted to be mounted to a conventional skateboard having associated skate trucks and wheels, whereby each wheel thereof has a ski shoe removably mounted thereto, and wherein each ski shoe comprises a substantially flat carriage platform having an upturned front end member and a pair of longitudinal side-flanged runners to allow the shoes to slide over the snow in the same manner as conventional skis. Each ski shoe is provided with a pair of aligned slots to receive a flexible strap whereby each wheel is mounted to a ski shoe, and including holding blocks positioned against each wheel of the skateboard.

4 Claims, 6 Drawing Figures

SKI-SHOE-ATTACHMENT APPARATUS FOR SKATEBOARDS

BACKGROUND OF THE INVENTION

1. Field of the Invention

This invention relates to a ski device and more particularly to ski shoes arranged to be attached to conventional skateboards and like apparatus having skate-type wheels.

2. Description of the Prior Art

The sport of skateboarding has become very popular world-wide at the present time. Such skateboards are limited to good weather conditions--that is, areas that are subjected to snowfall provide only a limited seasonal use of skateboards. Thus, it is desirable to have a means to convert the conventional skateboard to a device that can also be used in snow.

Some attempts have been made to provide an answer to the above, and the following U.S. patents are examples.

U.S. Pat. No. 332,575 shows a board having two sets of runners which would provide a very limited use in packed snow or ice.

In U.S. Pat. No. 1,802,116 a snow skate is disclosed having a runner attached to skates rather than to a skateboard.

Again, in U.S. Pat. No. 3,153,543 another form of ski combination is illustrated with a wheeled scooter.

A convertible coaster steered by a tilting rider support, having a front and rear sled runner attached thereto, is disclosed in U.S. Pat. No. 3,203,706.

SUMMARY OF THE INVENTION

The present invention comprises a ski-shoe apparatus that is designed to be removably attached to conventional skateboard devices. Accordingly, the skateboard includes a pair of suitable well-known trucks having a pair of skate wheels attached thereto, wherein each wheel is provided with an individual ski shoe. That is, each ski shoe is readily adapted to be mounted to each wheel, thereby providing a skateboard having a front and a rear pair of ski shoes, so as to allow the skateboard to have the normal movability and operating action it would have with just the wheels. Thus, various snow-covered surfaces can be traversed by the combination of the skateboard and the ski shoes mounted thereon.

Each ski shoe comprises a substantially flat carriage platform having an upturned forward end and a pair of depending side runners to give directional control to the apparatus.

The carriage includes aligned slots or apertures to receive a flexible strap member, wherein a pair of holding blocks cooperate therewith to function as a means to removably secure a respective wheel to the carriage of the ski shoe.

OBJECTS AND ADVANTAGES OF THE INVENTION

An important object of the present invention is to be able to convert a conventional skateboard apparatus to a ski-operating device for use in snow and like conditions, whereby skateboarding will no longer be considered a seasonal type of sport.

A further object of the invention is to provide a ski shoe that is readily adaptable to be mounted to various sized wheels associated with conventional skateboards, wherein special arrangements or changes to the skateboard are not required.

A still further object of the invention is to provide a skateboard with two pairs of ski shoes, whereby the skateboard can be operated in the snow and controlled in movement as with a conventional skateboard without the ski shoes.

It is another object of the invention to provide two sets of ski shoes for attachment to a conventional skateboard, the sets being relatively inexpensive to manufacture yet simple and rugged in construction.

It is still another object of the invention to provide an apparatus of this character that can be mounted to the wheels of a skateboard with simple conventional tools, such as a screwdriver.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

DESCRIPTION OF THE PREFERRED EMBODIMENT

Figure 1:
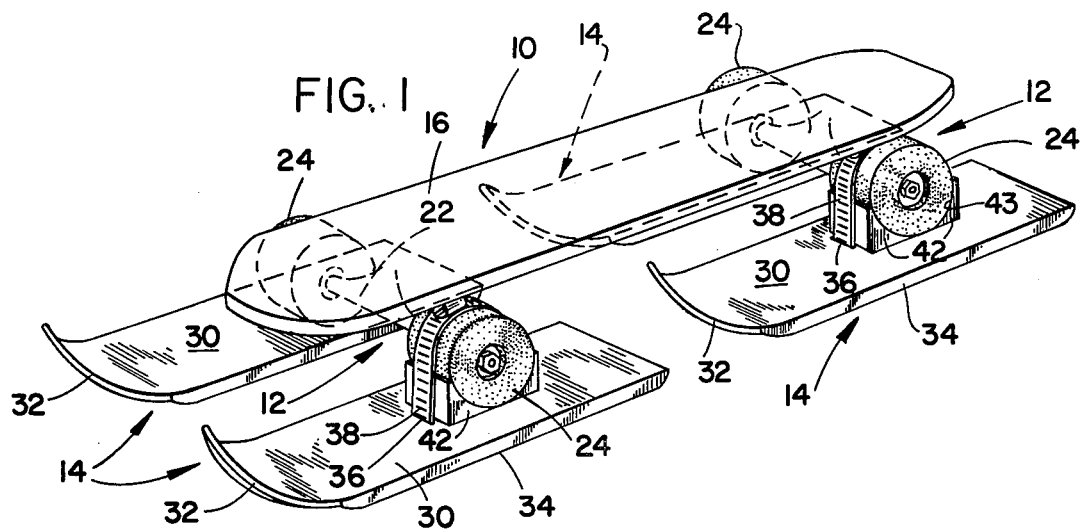
FIG. 1 is a perspective view of a conventional skateboard having the present ski shoes attached to each wheel thereof.

Referring more particularly to FIG. 1, there is shown a typical, well-known type of skateboard, indicated generally at 10, having a pair of wheel-and-truck assemblies, designated by numeral 12. Each wheel-and-truck assembly is shown having a pair of ski-shoe members, indicated at 14, attached thereto.

As is well known, the skateboard comprises an elongated substantially horizontal skateboard platform or board 16, which is most often formed from a wood or plastic material, on which the user thereof places one, foot, while pushing the board in a forward direction along a ground surface before placing the other foot on the platform—thereby riding on the board with both feet.

Accordingly, the platform or board includes a pair of wheel-and-truck assemblies 12 mounted thereto, as shown in FIG. 1, wherein one truck assembly is mounted adjacent the front end thereof and the second assembly 12 is mounted adjacent the rear of the board. The truck assemblies 12 are generally fastened to the underside of platform 10 by screws or bolts 19. Each wheel-and-truck assembly comprises a structural body or truck 18 wherein one or more resilient members 20 are attached thereto in such a manner as to allow the axle member 22 to move relative to structural body 18.

The details of the wheel-and-truck assembly are well known in the art of skateboards.

As shown in FIGS. 1 through 6, each truck assembly includes a pair of wheels 24 which are mounted to laterally extending axles 22 and positioned thereon by nut 25.

Thus, to provide for extended use of the skateboard in regional areas that are subjected to snow, the ski shoes 14 are arranged so as to be removably secured to each wheel of the trucks. Thus, the ski-shoe device comprises a first pair of ski shoes mounted to the forward wheel-and-truck assembly and a second pair of ski shoes mounted to the rear wheel-and-truck assembly.

Further, each ski shoe is removably attached to each individual wheel 24 as shown in the drawings. This arrangement of having each wheel provided with a ski shoe allows the rider thereof to perform various maneuvers that are possible with most skateboards. Thus, the skateboard is capable of turning in any direction that is possible without the use of the ski shoes.

Accordingly, each shoe comprises an elongated planar body member 30, generally formed of a metal or plastic material, wherein the body is substantially flat throughout its length and has a steep upturned nose portion 32 formed in the front end thereof, this upturned portion 32 being similar to the well-known water and snow skis, and being designed to accomplish the same purpose.

The flat planar body member 30 is further provided with elongated depending flange members 34 which define a pair of runners disposed along opposite longitudinal edges thereof. These runners allow directional control of the skateboard without causing drag.

Figure 5:
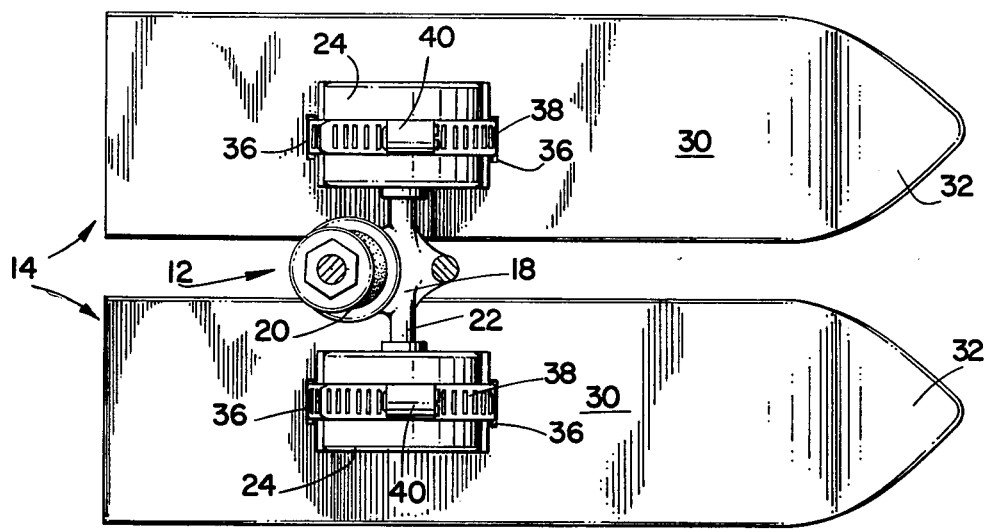
FIG. 5 is a cross-sectional view taken substantially along line 5—5 of FIG. 2, wherein the ski shoes are seen from above the wheels.
Figure 6:
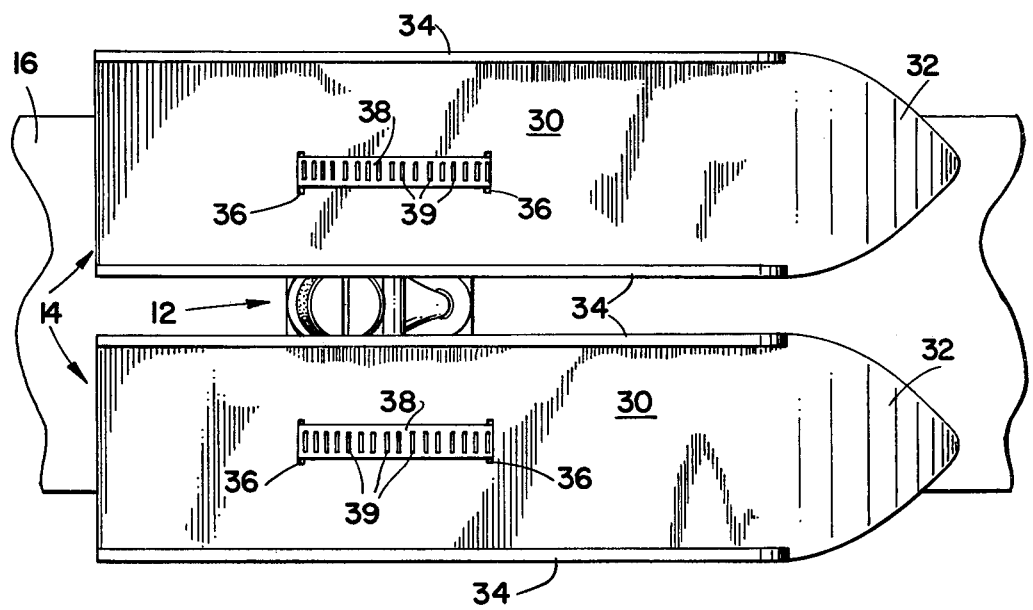
FIG. 6 is a bottom plan view of the ski shoes shown attached to a truck member.

Each ski shoe is provided with a means by which it is removably secured to each wheel 24. As indicated herein, the securing means comprises a pair of elongated slots 36 located within the flat portion of body member 30. These slots are disposed transversely and aligned in pairs longitudinally on said body member to receive therein a flexible strap member 38. Various suitable strap members may be employed; however, it is contemplated that each strap will be formed of metal having a plurality of juxtaposed slits 39 disposed transversely along the length of the strap so as to be adjustably received in screw coupling member 40. Thus, the strap is passed through each respective aligned slot 36, as seen in FIG. 6, and passes over the wheels as seen in FIG. 5, one end of the strap having screw member 40 affixed thereto with the opposite free end adapted to be received in said screw member.

Figure 2:
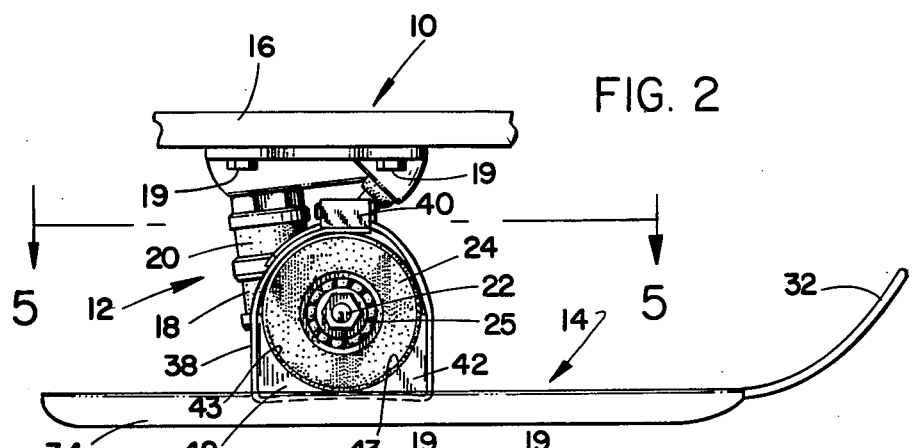
FIG. 2 is a side-elevational view of the front portion of the skateboard having a ski shoe attached thereto.
Figure 3:
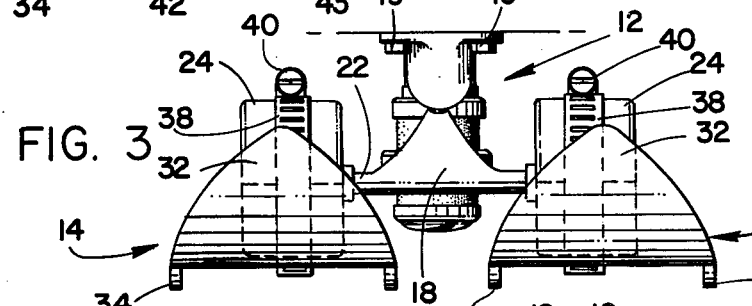
FIG. 3 is a front-elevational view of a pair of ski shoes attached to the front truck.
Figure 4:
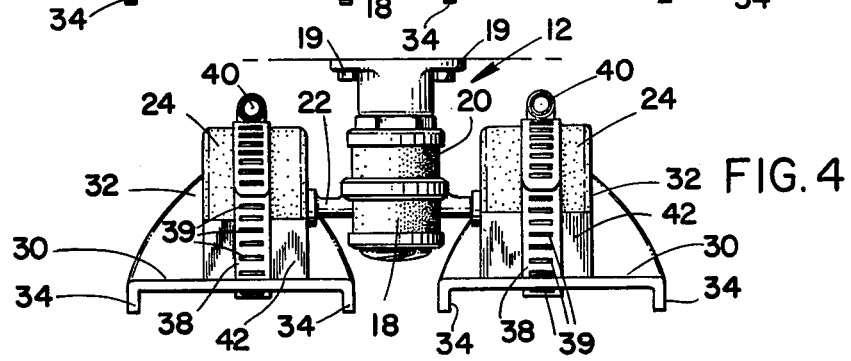
FIG. 4 is a rear-elevational view of the rear truck having ski shoes attached to each wheel thereof.

However, it is noted that to provide a rigid securing mount, there is also provided for each securing means a pair of wedge-shaped holding-block members 42 having an arcuate surface 43. Holding-block members 42 are positioned so that the wheel is cradled therebetween, engaging the arcuate surface 43 of each opposing block 42. That is, one block is positioned in front of the wheel and the second block is positioned abutting the rear of the wheel, as shown in FIG. 2.

Accordingly, strap 38 extends around the blocks and the respective wheel, thus securing the ski shoe in a rigid manner to the wheel only. Hence, each shoe is capable of moving individually with its respective wheel. When the shoe 14 passes over an irregular surface, it will move with its associated wheel 24 about axle 22.

Thus, the maneuverability of the skateboard with the ski shoes attached thereto is very similar to the skateboard in normal use with just the wheels.

The invention and its attendant advantages will be understood from the foregoing description, and it will be apparent that various changes may be made in the form, construction and arrangement of the parts of the invention without departing from the spirit and scope thereof, or sacrificing its material advantages, the arrangement hereinbefore described being merely by way of example; and I do not wish to be restricted to the specific form shown or uses mentioned, except as defined in the accompanying claims.

I claim:

1. A ski-shoe apparatus that is arranged to be removably mounted to each wheel of a conventional skateboard having a wheel-and-truck assembly, wherein said ski-shoe apparatus comprises:

a first pair of ski shoes removably mounted to the respective wheels of the forward wheel-and-truck assembly; and a second pair of ski shoes removably mounted to the respective wheels of the rear wheel-and-truck assembly; wherein each ski shoe thereof comprises:

a substantially flat carriage platform having an upturned forward end member formed thereon;

a pair of depending flanged runners, located longitudinally along each side of said carriage platform; and means of removably securing said ski shoe to said respective wheels thereof; wherein said securing means comprises:

a pair of longitudinally aligned slots disposed in said carriage;

a flexible strap member received in said aligned slots to clamp about said wheels;

means for holding said wheels in a fixed position relative to said carriage and strap member; and means for adjusting said straps about said wheels and said holding means, whereby each ski shoe thereof is mounted to each respective wheel so as to allow individual movement of each ski shoe with the movement of said wheel attached thereto.

2. A ski shoe as recited in claim 1, wherein said holding means comprises a pair of holding-block members disposed in an engaging relationship with each wheel to prevent rotational movement of said wheel with respect to said carriage.

3. A ski shoe as recited in claim 2, wherein said adjusting means comprises:

a plurality of juxtaposed slits disposed transversely along the length of said strap; and a screw coupling member affixed to one end of said strap and adapted to receive the opposite end thereof for adjustable engagement with said slits.

4. A ski shoe as recited in claim 3, wherein said holding block member is formed having a wedge-shaped configuration and an arcuate wheel-engaging surface.

* * * * *